Patented Apr. 22, 1930

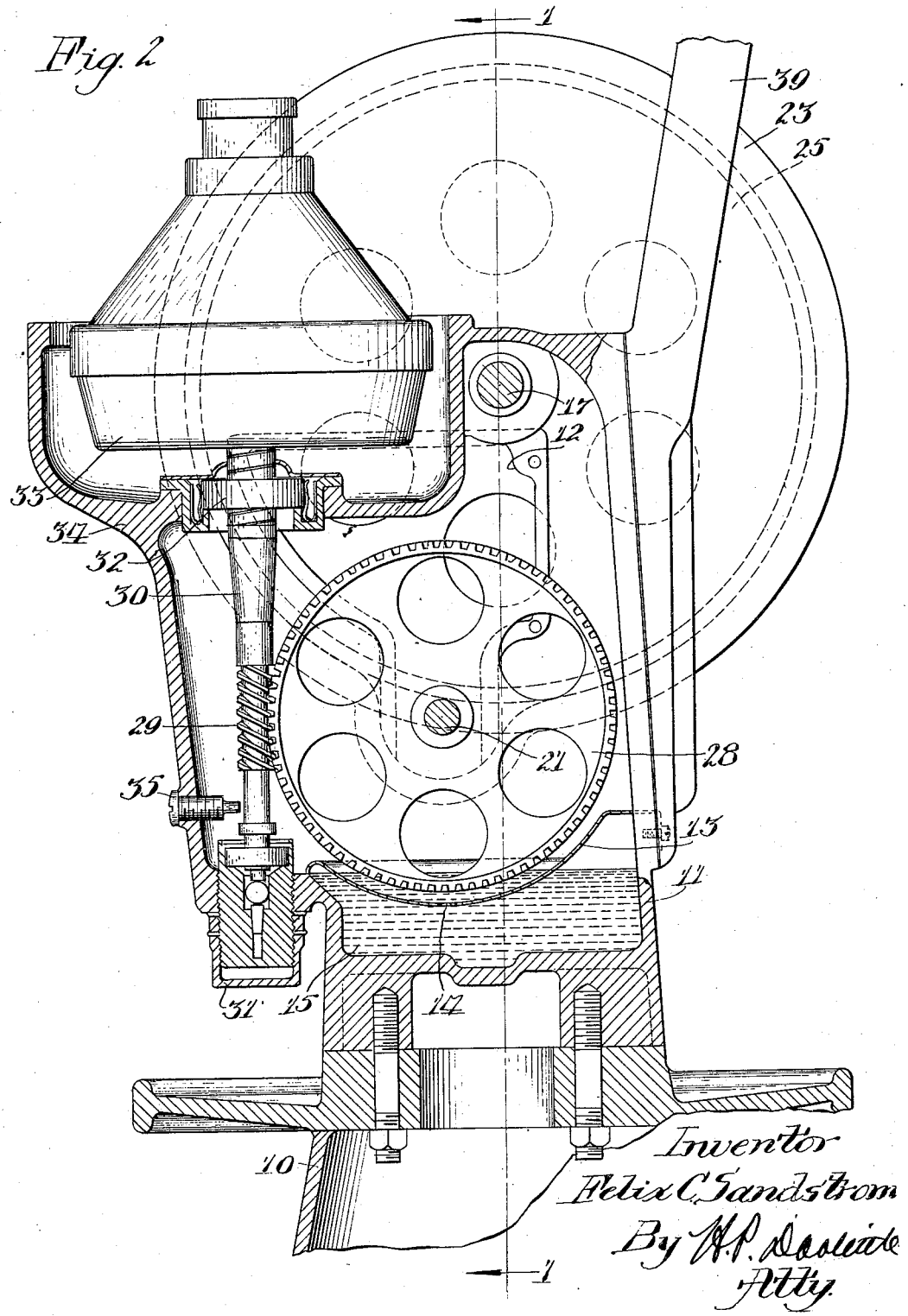

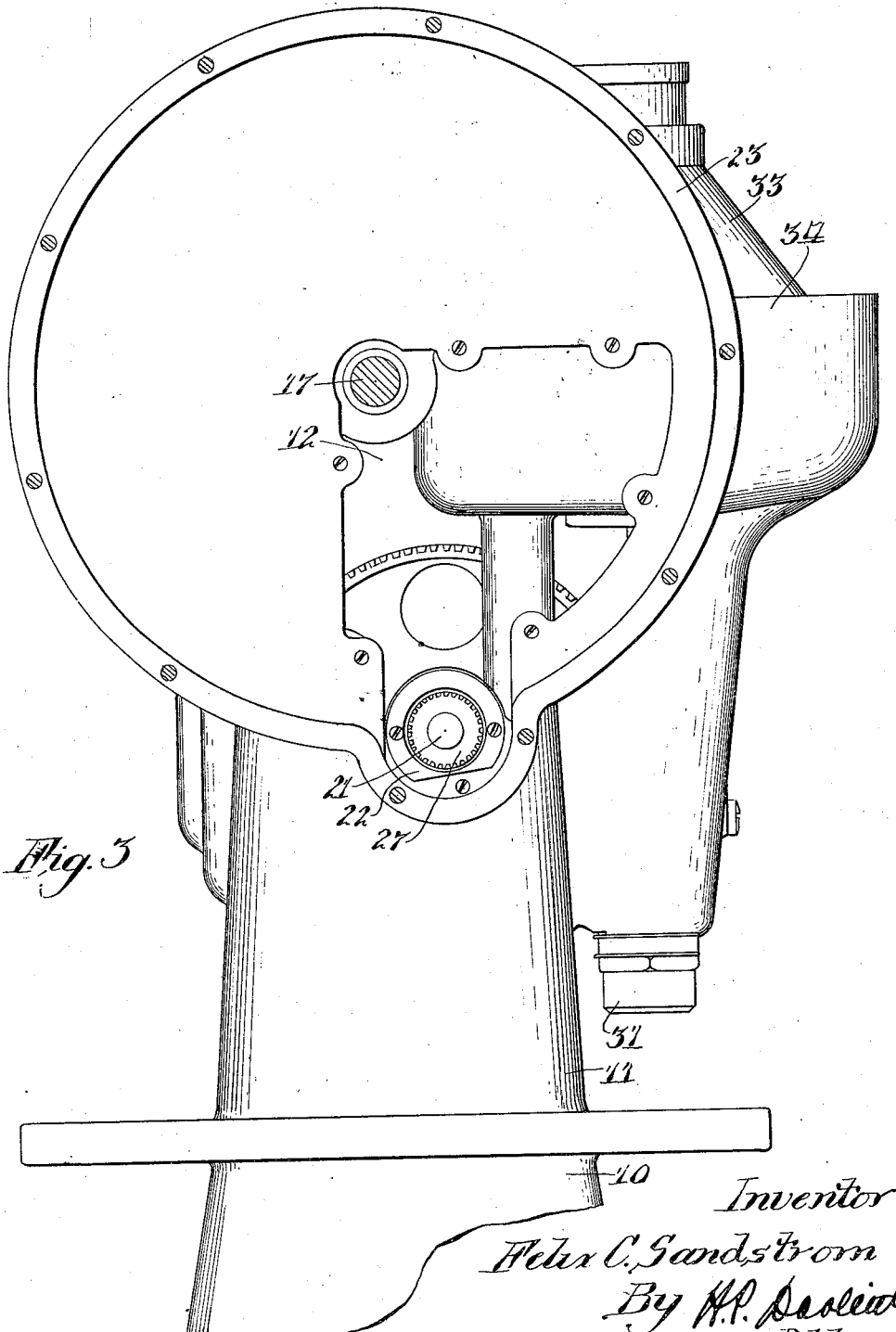

1,755,841

UNITED STATES PATENT OFFICE

FELIX CONSTANTIN SANDSTROM, OF MILWAUKEE, WISCONSIN, ASSIGNOR TO INTERNATIONAL HARVESTER COMPANY, A CORPORATION OF NEW JERSEY

CREAM-SEPARATOR GEAR HOUSING

Application filed May 18, 1927. Serial No. 192,354.

This invention relates to cream separators and particularly to an improved gear housing structure therefor whereby efficient lubrication of the operative parts contained therein may be effected. In machines of this kind as now generally known in the art, certain of the driving parts are exposed exteriorly of the main gear casing with the result that such gears and parts cannot be automatically lubricated. Their efficiency is impaired by the accumulation of dust, and, as they are exposed, they run noisily and are unsightly.

The objects of this invention are generally to improve the gear housing structure of a cream separator; to provide such a structure in which all of the gearing will be housed in dust proof casings; and, lastly, as an incident to the enclosed housing construction, to provide an improved splash lubricating system.

Briefly, these desirable objects are achieved in a cream separator having a frame, a main gear housing thereon closed at all sides with the exception of one, where it is in direct communication with an enlarged secondary enclosed gear casing. The first housing has journaled therein in bearings, a driving shaft which protrudes into the secondary casing where it carries a relatively large driving gear. In the first housing beneath the driving shaft is a driven shaft also extending into the secondary casing where it carries a small pinion in mesh with the large gear mentioned. Means in the form of a gear is carried on the driven shaft inside the main housing which plays in an oil bath in the bottom of said housing to splash the oil to the bearings for the driving and driven shafts and also into the secondary housing, to lubricate the gears contained therein.

An illustrative embodiment of the invention is shown in the accompanying sheets of drawings, wherein:

Figure 2 is a similar view but looking at right angles, as seen along the section line 2—2 of Figure 1; and Figure 3 is an elevational view looking at the back of the construction shown in Figure 2 with the cover plate for the secondary housing removed.

Figure 1:
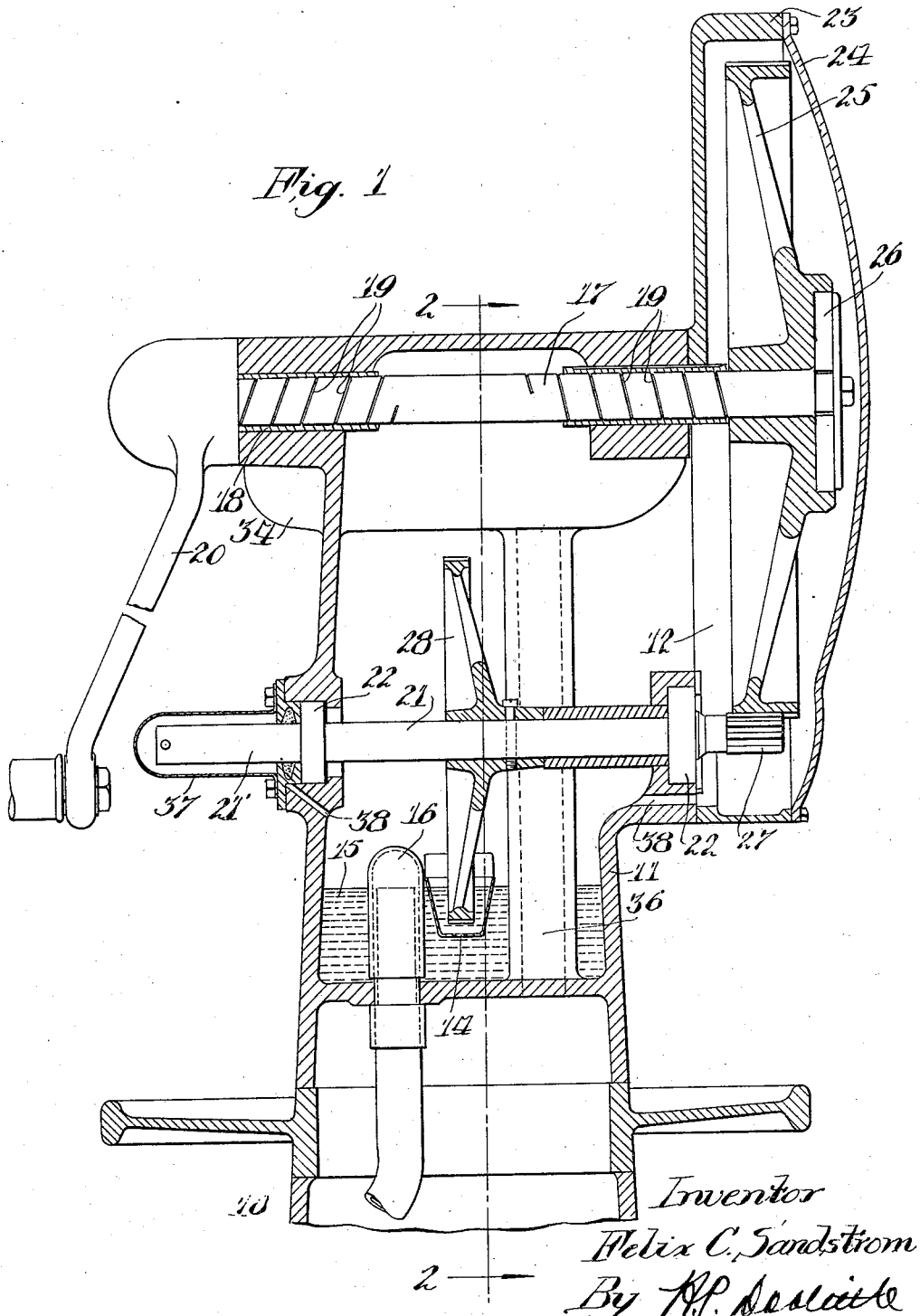
Figure 1 is a general, vertical elevational view through the machine as seen along the line 1—1 of Figure 2 when viewed in the direction of the arrows.

Looking now to the drawings, it will be seen that the improved cream separator embodies a frame or stand 10 having secured thereto in any approved manner, a main gear housing 11 closed at all sides except one, where it is open as indicated at 12. The bottom of the main housing 11 carries an oil trough 13 having an orifice 14 in its bottom, so that oil may seep upwardly therethrough from an oil bath 15, the level of which is maintained uniform beneath the side walls of the trough 13 by any approved form of overflow drain device 16.

A driving shaft 17 extends transversely through the upper end of the main housing 11, said shaft being journaled in bearings 18 and provided with oil grooves 19, as best shown in Figure 1. A crank handle 20 is connected thereto at one end, whereby the shaft may be manually rotated as is usual in these machines. Arranged also in the main gear housing 11 below the driving shaft 17 is a driven shaft 21 extending transversely and journaled in bearings 22 mounted in the housing.

The driving shaft 17 and the driven shaft 21 both protrude outwardly beyond the gear housing 11 at the side where it is open at 12 and extend into an enlarged, secondary gear housing 23, which is closed by a cover plate 24. Inside of this secondary housing the driving shaft 17 carries a relatively large, loose driving gear 25 driven through the medium of any suitable form of overrunning type of clutch 26, while the extended end of the driven shaft 21 carries a relatively small pinion 27 in mesh with the large drive gear 25. It is to be noted that the secondary housing 23 extends above the top of the housing 11 and that through the opening 12 it is in communication with the interior of the main housing 11. It is desirable that the driving gear 25 be of the openwork type, as shown, so that oil may be passed through the gear for a purpose later to appear.

The driven shaft 21 has made fast thereto inside of the main gear housing 11, a gear 28, which meshes with a worm pinion 29 formed on a vertical spindle 30 journaled in a lower bearing 31 in the main housing casting 11 and in a neck bearing 32 carried in the upper end of said housing casting, as best shown in Figure 2. This driven spindle 30 carries and drives the separating bowl 33 which may be nested, as shown, in a bowl part 34 formed with the casting 11. A set screw 35 functions to keep the spindle from riding up out of the bearing 31, as is usual in this art. A drain tube 36 leads from the bottom of the bowl part 34 through the main gear housing and out through the bottom thereof, as shown in Figure 1, to drain off any spilled milk coming from the bowl 33.

The shaft 21 at its other end may be extended through the housing 11, as shown at 21' to serve as a power take-off shaft when it is desired to operate the gearing by means of a motor. A cover 37 encloses this shaft extension 21' when it is not in use.

Oil drain ducts 38 lead from the bearings 22 for the shaft 21 back to the oil bath 15. It is also to be noted that the bearings 22 are respectively open to the interior of the main housing 11 and the secondary housing 23, so that oil may be splashed to these bearings and be drained back through the ducts 38, as will be understood. A bracket 39, only partly shown, is carried on the casing 11, which bracket, in the usual way is adapted to support a supply receptacle, not shown, over the bowl 33.

In operating the improved cream separator of this disclosure, the bowl 33 and spindle 30 are removed and a supply of lubricant is poured through the opening for the neck bearing 32. This oil settles in the bottom of the main gear casing 11, as shown in Figure 1, its level being maintained by the over-flow drain device 16. The clean oil, of course, is at the upper surface of this bath and it is this upper portion of the oil which jets upwardly through the orifice 14 into the trough 13, there to be picked up by the very rapidly rotating gear 28 playing in this trough. It will be understood, of course, that the gear 28 derives its rotation by operation of the crank 20, which turns the shaft 17, gear 25 through the clutch 26, and the pinion 27 and shaft 21 upon which said gear 28 is made fast. Thus, this clean jet oil, due to the very rapid rotation of the gear 28, is sprayed and splashed in vapory form upwardly to the bearings 18 for the shaft 17, where the oil grooves 19 serve to permit seepage of the oil along the length of the shaft in its journals. The oil, of course, also gets into the exposed bearings 22 for the shaft 21 and drains back into the oil bath 15, as has been described.

The gear 28 additionally throws the oil to the neck bearing 32, as can be seen. The most important feature of this construction, however, is the splashing of the oil in its cloud-like vapor form through the passage 12 and into the secondary gear casing 23, there to circulate freely through the open gear 25 to the clutch 26 and, of course, to the gears 25 and 27 in this secondary housing.

The secondary housing is offset upwardly and outwardly of the main housing in a manner permitting communication through an opening of relatively large size which extends substantially from the top of the main housing to the bottom of the offset housing. Thus, when the cover 24 has been removed along with the gear and clutch parts on the shaft 17, it is possible for a person to have easy access into the main housing with his hand. Such access is of the greatest importance.

Thus, it will be seen that an improved gear housing construction has been provided for machines of this kind, in which all of the gearing is enclosed to exclude dirt and provide effective lubrication for the operative parts contained therein. Furthermore, the noise from these rapidly rotating gears is effectively deadened, and also the unsightly appearance of exposed gearing is overcome. The greatest advantage, of course, is in maintaining during operation, automatically and constantly, a supply of clean lubricant to the operative parts contained in the secondary housing 23.

It is the intention to cover all such modifications and variations of the structure herein disclosed which do not materially depart from the spirit and scope of this invention as indicated in the appended claims.

What is claimed as new is:

1. In a cream separator, a frame, a closed housing thereon containing oil in its bottom, a driving shaft journaled in bearings in said housing, a gear loose on one end of the shaft outside of the housing, a clutch on the shaft for driving said loose gear, a closed offset housing surrounding said gear and clutch and having communication through a relatively large opening extending from the top of the first mentioned housing to the bottom of the offset housing, a driven shaft in the first housing operated by the gear in the second housing, means for splashing oil from the bottom of the first housing to the bearings for the driving shaft and into the second housing to oil the gear and clutch, and a removable cover plate for the offset housing.

2. In a cream separator, a frame, a closed housing thereon, a driving shaft journaled in bearings in said housing, a gear at one end of the shaft outside of said housing, a second closed housing surrounding said gear and communicating with the first housing, a driven shaft in the first housing, said driven shaft extending into the second housing, a pinion on the driven shaft in mesh with the gear on the driving shaft, an oil containing trough in the bottom of said first housing, and a gear on the driven shaft and arranged in the first housing to rotate through the oil in said trough to splash the oil therefrom and deliver it to the shaft bearings and into the second housing to lubricate the gears therein.

3. A cream separator having a main housing including an oil sump and a gear operable therein to splash the oil, a vertically disposed gear housing offset exteriorly from the main housing and having a part extending thereabove, said housings being in direct communication through an opening extending from the top of the main housing to the bottom of the offset housing, and a vertically disposed removable cover plate included in the outer face of the offset housing to permit access into the main housing.

4. A cream separator having a main housing including an oil sump, a shaft carried in bearings in said main housing, a gear on the shaft, a vertically disposed exterior gear housing offset upwardly and outwardly of the main housing, gearing in the offset housing, said housings having communication through an enlarged opening extending substantially from the top of the main housing to the bottom of the offset housing, said gear in the main housing splashing the oil into the offset housing, and means for by-passing the oil from said offset housing underneath one of the shaft bearings and back into the oil sump.

5. A cream separator having a main housing including an oil sump, a pair of parallel shafts therein, each extending laterally through one side of the housing, an exterior offset housing in communication with the first housing and into which the extended ends of the shafts are located, gearing connecting the shafts in the offset housing, said offset housing being vertically disposed and having its outer face open, a vertically arranged removable cover plate closing said opening, and means on one of the shafts in the first housing to spray oil from the sump therein throughout the first housing and into the offset exterior housing.

In testimony whereof I affix my signature.
FELIX CONSTANTIN SANDSTROM.